No. 675,211. Patented May 28, 1901.
F. HAMMOND.
CORN PLANTER.
(Application filed Jan. 25, 1901.)
(No Model.) 3 Sheets—Sheet 3.
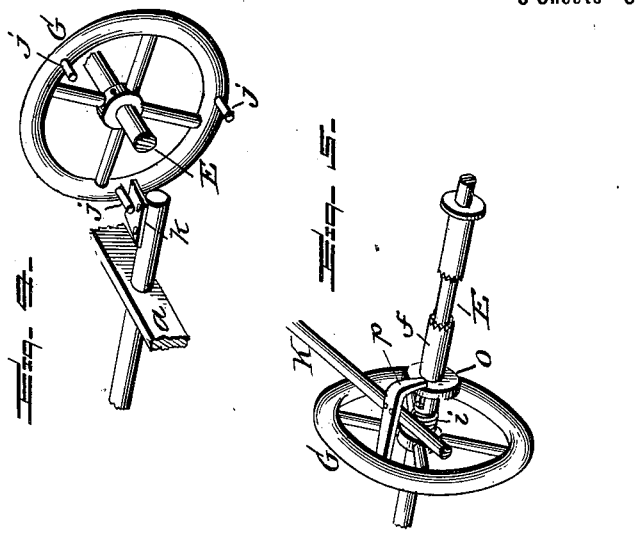
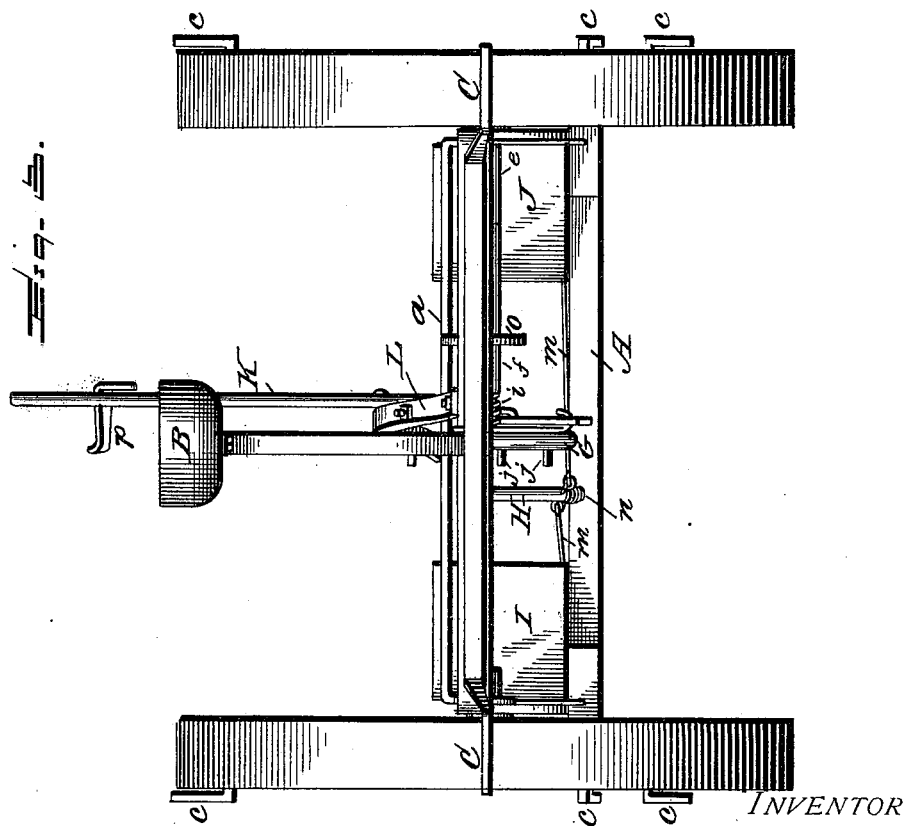
WITNESSES:
INVENTOR
Fay Hammond
BY Chas H. Fowler
Attorney
THE NORRIS PETERS CO., PHOTO-LITHO., WASHINGTON, D. C.

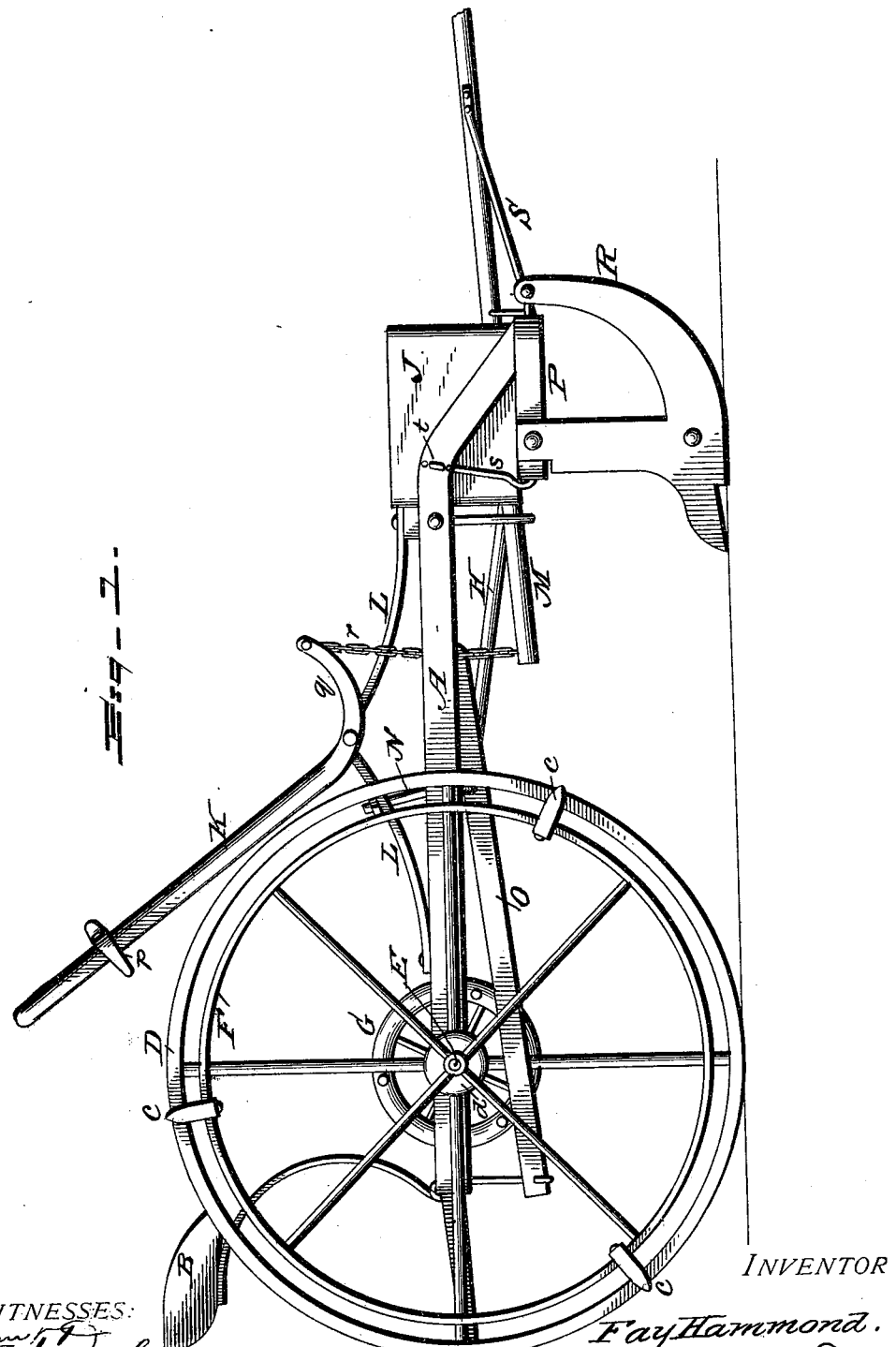

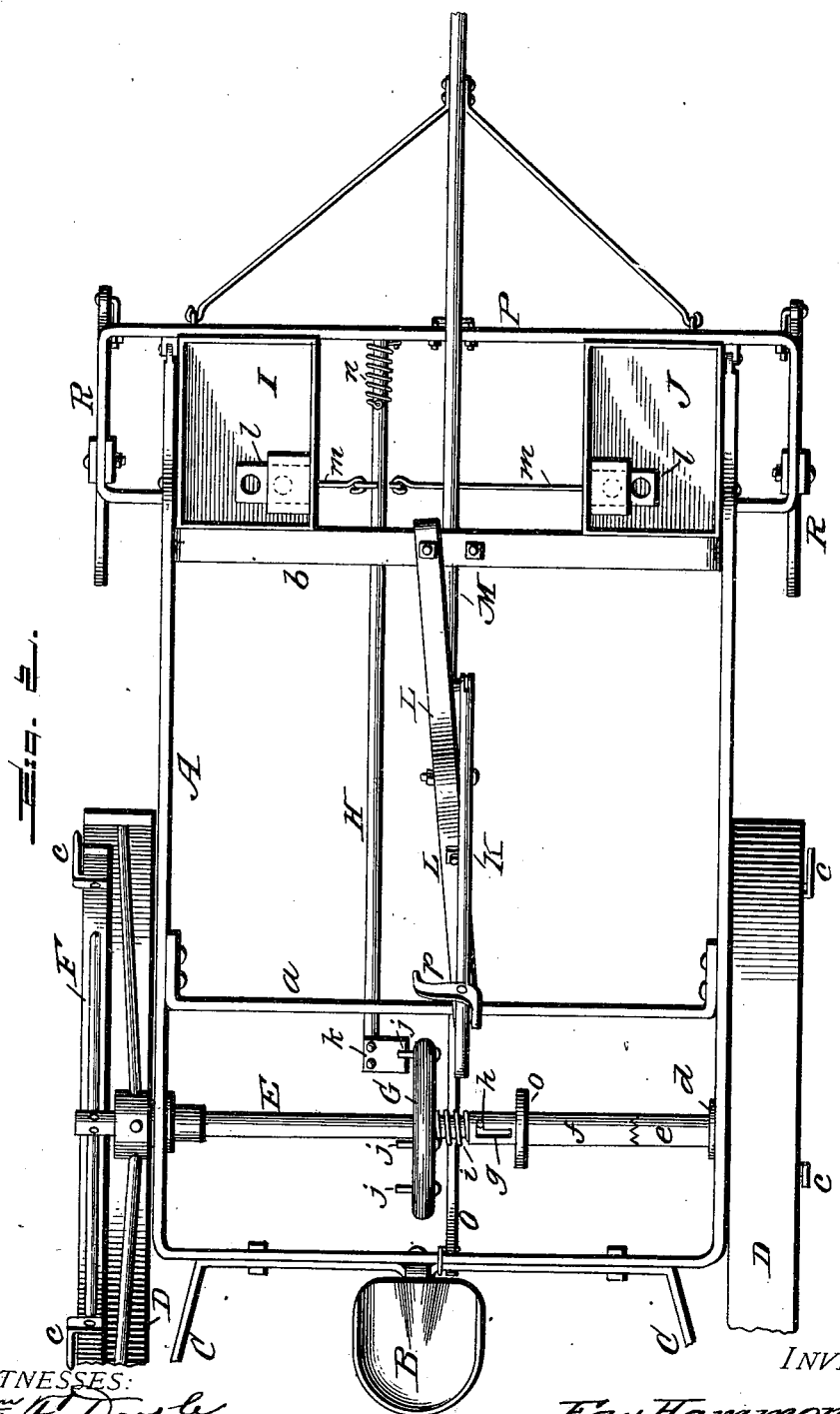

UNITED STATES PATENT OFFICE.

FAY HAMMOND, OF KAHOKA, MISSOURI.

CORN-PLANTER.

SPECIFICATION forming part of Letters Patent No. 675,211, dated May 28, 1901.

Application filed January 25, 1901. Serial No. 44,753. (No model.)

*To all whom it may concern:*

Be it known that I, FAY HAMMOND, a citizen of the United States, residing at Kahoka, in the county of Clark and State of Missouri, have invented certain new and useful Improvements in Corn-Planters; and I do hereby declare that the following is a full, clear, and exact description of the same, reference being had to the annexed drawings, making a part of this specification, and to the letters of reference marked thereon.

The present invention has relation to certain new and useful improvements in corn-planters; and the object thereof is to improve the planter in the several details of construction, whereby the same is rendered easily operative and effective in its purpose and that will possess the required strength and durability, securing both perfection in action and simplicity in construction, thereby enhancing the value of the machine and rendering the same more acceptable to the farmer.

The invention consists in a corn-planter constructed substantially as shown in the drawings and hereinafter described and claimed.

Figure 1 of the drawings is a side elevation of a corn-planter constructed in accordance with my invention; Fig. 2, a top plan view thereof; Fig. 3, a rear end view; Fig. 4, a detail view in perspective of the trip-wheel and rod with bearing-plate, which connects with the feed-hopper slides, the parts being shown in their relative position; Fig. 5, a similar view of the trip-wheel, the axle with clutch-box thereon, the lever with arm, showing it in engagement with the disk on the clutch-box, and the trip-wheel.

In the accompanying drawings, A represents the frame of the corn-planter, and $a$ $b$ the transverse braces thereof, which are secured to the sides of the frame in any convenient manner, said frame being of any suitable form and construction.

The rear of the frame A is provided with the usual driver's seat B and the scrapers C for the rim of the driving-wheels D, said seat and scrapers being of any suitable form and connected to the frame in any well-known manner.

The driving-wheels D are mounted upon the axle E in the usual manner, so that the wheels will revolve thereon similar to the ordinary vehicle-wheel when not locked to the axle.

Within the driving-wheels D are supplemental wheels F, which are rigidly secured to the axle E and revolve therewith, the rim of the supplemental wheels being of less width than the width of the driving-wheels and of less diameter, said supplemental wheels having any desirable number of spurs $c$ upon the rim thereof and which project out beyond the outer periphery of the driving-wheels. These spurs are adapted to enter the ground and make a mark therein to serve as means for guiding the cross-marking, and the supplemental wheels, being of less diameter than the diameter of the driving-wheels, are raised from the ground, and as the rims of the supplemental wheels do not extend beyond the rims of the driving-wheels a double security is obtained against the supplemental wheels coming against or striking the ground, except the spurs, as hereinbefore described.

The hub $d$ of one of the driving-wheels D has rigidly connected therewith in any suitable manner the section $e$ of a clutch-box, the section $f$ of said box being loosely mounted upon the axle E. The two sections of the clutch-box are provided with teeth at their inner ends in the usual manner, so as to engage with each other when it is desired to lock the two sections together, the section $f$ being slidable on the axle E and is formed with an L-shaped locking-slot $g$, with which engages the pin $h$, projecting from the axle. The box-section $f$ is rendered spring-actuated by means of the coiled spring $i$ bearing against the outer end thereof, and when the two clutch-box sections are locked together, as shown in Fig. 2 of the drawings, the revolution of the driving-wheel, with the box-section secured to its hub, will cause the axle to revolve with it.

A trip-wheel G is mounted upon the axle E and the coiled spring $i$ is located on the axle between said wheel and the outer end of the box-section $f$, so as to render the action of the clutch-box automatic in throwing the machine into gear.

The trip-wheel G is firmly secured to the center of axle E, said wheel having two or more pins $j$ projecting from the side thereof, which pins in number should correspond with the number of spurs $c$ upon the supplemental wheels F, and by increasing the number of pins in the trip-wheel the planter may be converted into a drill. A trip-rod H is provided, which is operated by the pins $j$ on the trip-wheel G, as shown in Fig. 2 of the drawings, said pins striking in succession a bearing-plate $k$ upon the end of the trip-rod. This trip-rod extends forward to the front of the frame of the corn-planter and has its bearing therein. A spiral spring $n$ has its coils encircling the trip-rod with its ends connected, respectively, to said rod and to the frame.

The trip-rod H is connected to the usual slides $l$ of suitable hoppers I J through the medium of rods $m$ or by any other suitable and well-known means.

When the axle of the corn-planter is caused to rotate, the pins on the trip-wheel coming against the bearing-plate on the trip-rod will intermittently operate the slides of the hoppers and discharge the contents thereof when in the act of planting. Should the clutch-box be released from engagement with the axle, the axle would remain stationary while the driving-wheels revolved thereon, and thereby the rod would cease to operate the slides of the hopper. The coiled spring $n$ upon the front end of the trip-rod H renders the rod spring-actuated in resuming its normal position after being acted upon by the pins $j$ of the trip-wheel G. A device is provided for releasing the slidable clutch-box section $f$, in order to throw the machine out of gear when the hopper-slides are not to be operated. The slidable section $f$ of the clutch-box is provided with a disk $o$, against which acts an arm $p$ when brought in contact therewith, said arm being secured to a hand-lever K, pivoted to supports L. When the lever is depressed by the driver upon the seat of the planter a sufficient distance to come in contact with the disk, the slidable section $f$ of the clutch-box will be drawn in, which will disengage the teeth thereof with the teeth of the section $e$, and thus throw the machine out of gear.

I do not wish to be understood as limiting my invention to any particular means of operating the slidable clutch-box section, as any means may be substituted for that shown which will be in convenient reach of the driver.

The pivoted hand-lever K has a curved lower end, as shown at $q$, and connects with the front of the frame of the machine through the medium of a suitable chain $r$, as shown in Fig. 1 of the drawings, by which means the front of the frame may be raised, the chain being preferably connected to the inner end of the pole M of the machine. A hanger N upon the supports L has connected to it a foot-lever, arm, or bar O, to which the chain $r$ is also connected, by which the raising of the front of the machine may be accomplished by foot-power, or any suitable means may be used for elevating the front of the frame, as that shown is only one of many means that may be successfully employed.

Any suitable foot-lever or device may be used for elevating the front of the machine that will successfully attain the object, the foot-lever arm O being of the usual form employed for this purpose. The arm $p$ is secured upon the upper end of the lever K, and when said lever is brought down in position to cause the arm to engage the disk $o$ upon the slidable clutch-box section $f$ in order to slide it away from contact with the section $e$, the opposite end of the arm $p$ will engage the trip-wheel G between the spokes thereof, and thereby hold the lever stationary, and also the slidable clutch-box section out of engagement with the section $e$, and at the same time elevate the front of the machine, the engagement of the arm with the disk and the trip-wheel being shown in detail in Fig. 5 of the drawings.

The front of the frame A has connected thereto a transverse supplemental frame P, from which depend the usual runners or shoes R, suitable braces connecting the pole or tongue M with the supplemental frame P, as shown at S, the pole or tongue being connected to the frame of the machine in any preferred manner.

The supplemental frame P may be connected to the main frame A by suitable hanger-rods $s$, which engage one of a plurality of holes $t$ in the frame A, so that the supplemental frame may have its height adjusted as required in regulating the depth of planting.

In describing the main and supplemental frames and the several parts connecting therewith I wish it understood that the same are susceptible of many changes and modifications, which may be resorted to without in any manner affecting the general features of novelty or departing from the principle of the invention, any such changes being made as would come within ordinary mechanical judgment.

Having now fully described my invention, what I claim as new, and desire to secure by Letters Patent, is—

1. In a corn-planter, a suitable frame, an axle with driving-wheels, a spring-actuated clutch-box mounted upon the axle and engaging one of the driving-wheels with the axle, a trip-wheel rigidly connected to the axle and having pins thereon, a pivoted lever with a cross-arm adapted to operate and hold out of engagement the slidable section of the clutch-box and also to engage the trip-wheel, and a spring-actuated rod connecting with the slides of the hopper and adapted to operate the same, said rod having at one end a bearing-plate to engage the pins on the trip-wheel, substantially as and for the purpose specified.

2. A corn-planter consisting of a suitable frame with hoppers and slides connecting therewith, driving-wheels, and supplemental wheels of less circumference than the driving-wheels and located within the same and having suitable spurs, a clutch device on the axle, a trip-wheel rigidly connected to the axle and having pins or projections thereon, a pivoted lever with cross-arm for operating the clutch-box and to engage the trip-wheel, and a spring-actuated rod connecting with the slides of the hoppers for operating the same, and a bearing-plate on the rod to engage the pins or projections on the trip-wheel, substantially as and for the purpose specified.

In testimony that I claim the above I have hereunto subscribed my name in the presence of two witnesses.

FAY HAMMOND.

Witnesses:
BEN McCORTY,
CHAS. F. HOLDEFER.